Nov. 14, 1933.  I. W. BROGGER  1,934,964
MEASURING INSTRUMENT
Original Filed May 9, 1930
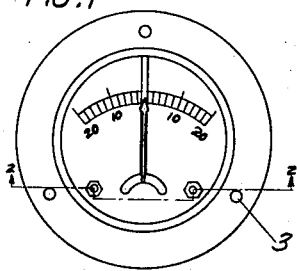
FIG. 1
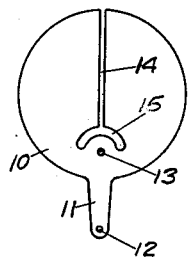
FIG. 3
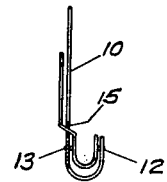
FIG. 4
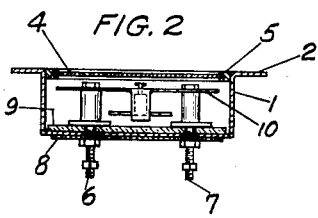
FIG. 2
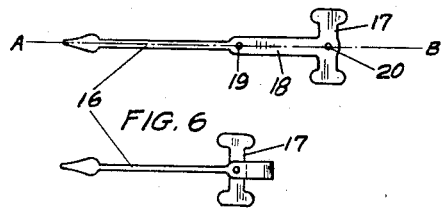
FIG. 5
FIG. 6
FIG. 7
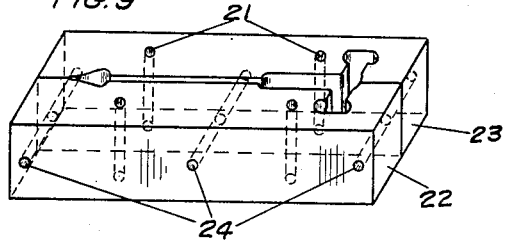
FIG. 9
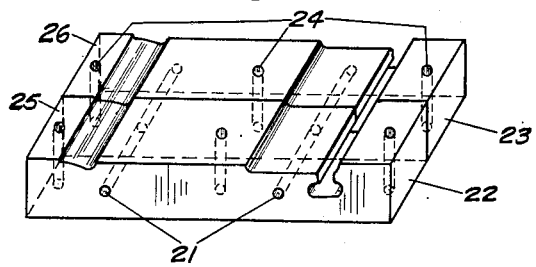
FIG. 8
Inventor
IVAR W. BROGGER
Attorney
A. D. T. Libby Patented Nov. 14, 1933

1,934,964

UNITED STATES PATENT OFFICE 1,934,964

MEASURING INSTRUMENT

Ivar W. Brogger, West Orange, N. J., assignor to Connecticut Telephone & Electric Corporation, Meriden, Conn.

Application May 9, 1930, Serial No. 450,975
Renewed February 17, 1933

11 Claims. (Cl. 171—95)

This invention relates to measuring instruments and, more particularly, to instruments for making electrical measurements.

One of the objects of the present invention is to provide a novel unitary pointer and armature construction for a measuring instrument.

Another object of the invention is to provide novel means for mounting the movable elements in measuring and indicating instruments.

Still another object is to provide a novel combination of elements in a measuring instrument so constructed and assembled as to render the same very accurate and efficient.

The above and further objects and novel features of this invention will more fully appear from the following detailed description when taken in connection with the accompanying drawing. It is expressly understood, however, that the drawing is for the purpose of illustration only and is not designed as a definition of the limits of the invention, reference being had primarily for this purpose to the appended claims.

In the drawing wherein like reference characters refer to like parts:—

Figure 1 is a plan view of an electrical measuring instrument for measuring current.

Figure 2 is a section on the line 2—2 of Figure 1.

Figure 3 is a plan view of the dial used in the instrument.

Figure 4 is a part-sectional and part-elevational view through the dial showing the movable element carried thereby.

Figure 5 is a plan view of the blank used in making my new one-piece moving element.

Figure 6 is a plan view after the blank shown in Figure 5 has been formed into final position.

Figure 7 is a side view of Figure 6.

Figure 8 is a plan view of the die, showing the method of making the same according to the contour of the blank desired.

Figure 9 is a view of the die with the two parts shown in Figure 8 for making the blank shown in Figure 5.

Referring now to the details, 1 is a casing having a flange 2 for carrying the working parts of the instrument and for mounting it in any suitable mounting, holes 3 being provided in the flange 2 for the purpose of mounting. The face of the casing is closed with a transparent member such as a piece of glass 4, which is usually held in a resilient holder such as a ring of rubber 5. A pair of contact terminal studs 6 and 7 are carried by the casing, at least one of them, and preferably both, being insulated from the casing by insulators 8 and 9. Insulating bushings may be used, or as shown in the drawing, the holes through the bottom of the casing may be enlarged to provide sufficient clearance around the studs 6 and 7 so that they will not contact with the casing.

Carried on the inner ends of the studs 6 and 7 is a dial 10. The dial 10 is provided with a finger or projection 11 which is turned over to form a bight as shown in Figure 4 to furnish a support for the single-piece movable element to be presently described. Preferably the projection 11 is provided with a seat 12 for one of the pivots, while a second seat 13 is provided in the dial for the other pivot of the movable element. While I prefer to make the seats 12 and 13 in the form of depressions to receive the projections on the movable element, it is of course understood that the position of these parts may be reversed. The dial 10, in the illustrated embodiment, serves as an electrical conductor and is slotted at 14 to direct the current through that portion of the dial adjacent the slot 15 which lies directly over the armature of the moving element, the armature being pivotally mounted, in a novel manner to appear hereinafter, is thus adapted to move under the influence of, and in accordance with the magnitude and direction of, the magnetic field set up about said conductor.

In the form of the invention illustrated, the novel pointer-armature element is made from a single piece of metal preferably in sheet form. As shown in Figure 5, the moving element comprises a needle portion 16 and an armature portion 17, the two being joined together by an enlarged section 18 for the purpose of giving sufficient rigidity to this part of the moving system to sustain a pivot indentation 19 which is closely adjacent the beginning of the needle 16. A second pivot projection 20 is formed in the armature 17. The portion 18 is bent in a bight or loop form to the position shown in Figure 6, wherein the pivot points 19 and 20 are brought into alignment one above the other, and the armature 17 takes the position as shown in Figure 7.

In Figures 6 and 7, the finished moving element is shown adapted to be mounted in a mounting somewhat different from that shown in Figure 4 as the needle 16 is shown straight, but to use it in the construction shown in Figures 3 and 4, it need only be given the proper bend to allow the needle to pass through the slot 15 in the dial 10.

In order to get the two parts of the moving element on each side of the line A—B absolutely symmetrical, whereby the moving element will be perfectly balanced in the instrument, I have found it necessary to resort to a special method of constructing the moving element, whereby the two parts on the opposite sides of the line A—B shown in Figure 5, will be substantially a perfect image one of the other. To accomplish this, I utilize a two-piece die, the parts of which are held together in any satisfactory manner as by pins 21 shown in Figure 8. With the two die pieces in this position, the die is machined to the contour of the moving element as desired; that is to say, so as to produce a blank as shown in Figure 5.

In the process of making the die, after the machine work has been approximately finished, the two parts of the die, 22 and 23, are taken apart and turned toward each other at an angle of ninety degrees in the position shown in Figure 9, these parts being then held together by any suitable means such as pins 24. A blank is then made by a cooperating punch and this blank, which will always be symmetrical about the line A—B, Figure 5, as long as the two die halves are machined at the same time, is then proven out as to its balance after the blank has been formed as in Figure 6. If the pointer end, for example, is too heavy, then the die is taken apart and the parts 22 and 23 placed back into the position shown in Figure 8, and a cutting or grinding operation is performed on either of the surfaces 25 or 26, whereby the proper width of the needle 16, the part 18, and the length of the armature 17 is obtained, and the blank is balanced with respect to the pivots after forming as in Figure 6. Succeeding operations are similarly performed until the desired blank has been obtained and the die is then ready for production purposes.

I have found that it is impossible to get the moving element symmetrical and balanced by the previous methods of making dies and that the above-described method will produce the desired result.

There is thus provided a measuring and indicating instrument employing a novel unitary moving element which is adapted to be mounted in a novel manner for free, substantially frictionless, pivotal movement. The moving element is so constructed that the same is inherently balanced and is adapted to be so mounted that vibrations and sudden jars will not affect its pivotal position. The instrument provided and the various parts thereof are simple in construction, easy to manufacture, readily assembled and inexpensive.

Although only one embodiment of the invention has been illustrated, it is to be expressly understood that the same may be adapted to many other types of measuring instruments and that changes may be made in the design and arrangement of parts illustrated without departing from the spirit of the invention, as for example, the pivot points on the pointer armature member may be countersunk therein, as well as struck therefrom. Reference will, therefore, be had to the appended claims for a definition of the limits of the invention.

Having thus described my invention, what I claim is:

1. For an electrical measuring instrument, a one-piece moving element including two integral portions, a pointer and an armature made from a single piece of sheet metal, the two parts of the moving element on either side of a longitudinal vertical plane through said element being a substantial image one of the other.

2. For an electrical measuring instrument, a one-piece moving element including two integral portions, a pointer and an armature made from a single piece of sheet metal, the metal joining the armature and pointer portions being materially wider than the pointer to give the necessary rigidity for the pivot located adjacent the beginning of the pointer, the other pivot being formed directly in the armature portion.

3. For an electrical measuring instrument, a one-piece moving element including two integral portions, a pointer and an armature made from a single piece of sheet metal, said armature extending at right angles from the sides of the pointer and at one end of the blank before forming to final shape.

4. For an electrical measuring instrument, a one-piece moving element comprising a blank made from sheet metal, said blank having an armature with a pointer extending at right angles from the center thereof, a portion of the extended part being materially wider than the major length of the pointer portion, a pivot located in the armature and one near the junction of the pointer portion and said wider portion, the element being bent at said wider portion into a loop whereby said pivots are brought into operative position.

5. In an indicating instrument, a one-piece movable element comprising an indicating pointer, an armature and a pair of pivots struck from one surface of said element for pivotally mounting the same.

6. In an indicating instrument, a one-piece movable element comprising an indicating pointer, an armature and a pair of diametrically disposed pivots, said element being symmetrical with respect to a vertical plane containing the longitudinal axis of said pointer.

7. In an electrical measuring instrument, an electrical conductor, a one-piece movable element comprising a pointer, an armature, and a pair of coaxial pivot points protruding from said element, said points being adapted to engage the opposed sides of a bight in the conductor to pivotally support said element, and means for mounting said conductor.

8. For an electrical measuring instrument, a one-piece movable element comprising two integral portions, a pointer and an armature made from a single piece of magnetic material, said element having a bight in one end thereof, and pivots on said element on opposite sides of said bight, for pivotally mounting the same.

9. In apparatus of the class described, a one-piece movable element having the shape of a pointer at one end, the other end being enlarged to form an armature portion and curved to form a bight therein, and pivot points struck from said element on opposed sides of said bight for pivotally mounting the element.

10. In an electrical measuring instrument wherein a pointer is adapted to indicate the characteristics of an electrical current passing through a conductor in said instrument, the combination of a projection from said conductor curved to form a bight therewith, a one-piece movable element constituting a combined pointer and armature, and pivot struck from said movable element adapted to engage said bight for pivotally mounting said element.

11. In an electrical measuring instrument, a one-piece movable element comprising an indicating pointer and an armature, and a pair of pivot points on said element for pivotally mounting the same.

IVAR W. BROGGER.